(12) United States Patent
Hojjatie et al.

(10) Patent No.: US 12,330,999 B2
(45) Date of Patent: *Jun. 17, 2025

(54) COMPOSITIONS COMPRISING SOLID THIOSULFATES, POLYSULFIDES AND/OR (BI)SULFITES AND METHODS FOR PREPARING SAME

(71) Applicant: Tessenderlo Group NV, Brussels (BE)

(72) Inventors: Michael Massoud Hojjatie, Tucson, AZ (US); Thomas David Fairweather, Dundee, OR (US); Jeroen Van Cauwenbergh, Baardegem (BE); Martijn Timmermans, Lommel (BE); Heidi van den Rul, Genk (BE)

(73) Assignee: Tessenderlo Group NV, Brussels (BE)

(*) Notice: Subject to any disclaimer, the term of this patent is extended or adjusted under 35 U.S.C. 154(b) by 1003 days.

This patent is subject to a terminal disclaimer.

(21) Appl. No.: 17/266,590

(22) PCT Filed: Aug. 7, 2019

(86) PCT No.: PCT/US2019/045544
§ 371 (c)(1),
(2) Date: Feb. 6, 2021

(87) PCT Pub. No.: WO2020/033575
PCT Pub. Date: Feb. 13, 2020

(65) Prior Publication Data
US 2021/0300831 A1   Sep. 30, 2021

Related U.S. Application Data

(60) Provisional application No. 62/716,243, filed on Aug. 8, 2018.

(30) Foreign Application Priority Data

Sep. 19, 2018  (EP) ..................... 18195470

(51) Int. Cl.
C05C 9/02 (2006.01)
C05C 9/00 (2006.01)
C05G 3/90 (2020.01)
C05G 5/30 (2020.01)

(52) U.S. Cl.
CPC .................. *C05C 9/02* (2013.01); *C05C 9/00* (2013.01); *C05C 9/005* (2013.01); *C05G 3/90* (2020.02); *C05G 5/30* (2020.02)

(58) Field of Classification Search
CPC .. C05C 9/02; C05C 9/00; C05C 9/005; C05G 5/30; C05G 3/90
See application file for complete search history.

(56) References Cited

U.S. PATENT DOCUMENTS

| 5,097,799 | A | * | 3/1992 | Heitfeld | A01K 1/0152 |
| | | | | | 119/172 |
| 5,618,658 | A | | 4/1997 | Penman et al. | |
| 7,494,525 | B2 | | 2/2009 | Hojjatie et al. | |
| 2006/0185411 | A1 | * | 8/2006 | Hojatie | C05D 3/00 |
| | | | | | 71/31 |
| 2007/0077428 | A1 | * | 4/2007 | Hamed | D06M 16/00 |
| | | | | | 428/375 |
| 2017/0050895 | A1 | * | 2/2017 | Ortiz-Suarez | C05C 11/00 |
| 2018/0008853 | A1 | | 1/2018 | Shulgin | |

FOREIGN PATENT DOCUMENTS

| CA | 1269859 A | 6/1990 |
| CN | 1110896 A | 11/1995 |
| CN | 1958527 A | 5/2007 |
| CN | 102701818 A | 10/2012 |

(Continued)

OTHER PUBLICATIONS

XP-002795377, Database WPI, Week 201747, Thomson Scientific, London, GB; AN 2017-32674L & CN 106,673,907 A (Univ Guizhou) May 17, 2017.

(Continued)

*Primary Examiner* — Wayne A Langel
(74) *Attorney, Agent, or Firm* — N.V. Nederlandsch Octrooibureau

(57) ABSTRACT

Provided in the invention are thiosulfate-urea based products (IIa) and/or a polysulfide-urea based products (IIb) and/or a (bi)sulfite-urea based products (IIc) suitable for use in fertilizers and comprising: one or more urea-containing compounds (a), one or more compounds (b), optionally, one or more urease (c1) and/or nitrification (c2) inhibitors that are different from compounds (b), and/or optionally, one or more additives (d) that are different from any of the above compounds, wherein the amount of water (e) in the product (II) is less than about 10 wt %, preferably less than about 5 wt %, wherein compounds (a) are selected from urea (a1) and/or from urea-aldehyde products (a2) and/or from urea-triazone compounds (a3), wherein compounds (b) are selected from thiosulfates (b1) and/or from polysulfides (b2) and/or from (bi)sulfites (b3). An advantage of products of the invention is that only minimal amounts of degradation products of compounds (b) are formed. Products of the invention can be made in various forms and in different ways. All of the materials of the invention are suitable for use in fertilizers and blend well with solid and liquid fertilizers standardly used.

18 Claims, No Drawings

(56) References Cited

FOREIGN PATENT DOCUMENTS

| CN | 106431777 A | 2/2017 |
| EP | 0289757 A2 | 11/1988 |
| EP | 0376853 A1 | 7/1990 |
| EP | 1298114 A1 | 4/2003 |
| EP | 235234 B1 | 3/2017 |
| WO | 2005/075602 A1 | 8/2005 |
| WO | 2016/070184 A1 | 5/2016 |
| WO | 2018/069486 A2 | 4/2018 |

OTHER PUBLICATIONS

PCT International Search Report and Written Opinion for PCT/US2019/045544, dated Jan. 7, 2020, 18 pages.

\* cited by examiner

COMPOSITIONS COMPRISING SOLID THIOSULFATES, POLYSULFIDES AND/OR (BI)SULFITES AND METHODS FOR PREPARING SAME

CROSS-REFERENCE TO RELATED APPLICATIONS

This application is the U.S. national stage of PCT/US2019/045544 filed Aug. 7, 2019, and claims priority to U.S. provisional application No. 62/716,243 filed Aug. 8, 2018, and Europe application no. 18195470.2 filed Sep. 19, 2018, all of which are hereby incorporated herein by reference for all that they each disclose.

FIELD OF THE INVENTION

The present invention relates to fertilizer compositions prepared from dry (solid, powder, . . . ) thiosulfates, polysulfides or (bi)sulfites, and their processes of making. Products of the invention are simple to make, have a wide applicability and find their use in both the liquid and solid fertilizer end markets. Products of the invention allow one to make easy-to-use NS fertilizers and/or to make a new type of stabilized fertilizers.

BACKGROUND OF THE INVENTION

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complexing abilities.

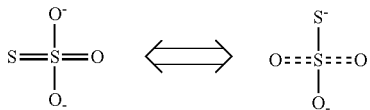

Thiosulfates are used in leather tanning, paper and textile manufacturing, flue-gas desulfurization, cement additives, dechlorination, ozone and hydrogen peroxide quenching, coating stabilizers, as an agricultural fertilizer, as a leaching agent in mining, and so on.

Due to their complex-forming abilities with metals, thiosulfate compounds have been used in commercial applications such as photography, waste treatment and water treatment applications.

Thiosulfates readily oxidize to dithionates, trithionates, tetrathionates, and finally to sulfates:

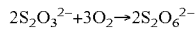

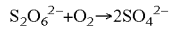

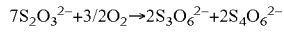

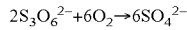

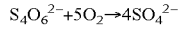

Due to this transformation, thiosulfates are used as fertilizers in combination with cations such as ammonium, potassium, magnesium and calcium. The ammonium, alkali metal and alkaline earth thiosulfates are soluble in water. Water solubility of thiosulfates decreases from ammonium to alkali metals to alkaline earth thiosulfates.

Potassium (K) is a primary plant nutrient. Potassium thiosulfate fertilizer contains the highest % K in liquid form, compared to other sources of potassium such as potassium chloride (KCl), potassium Nitrate ($KNO_3$), and potassium sulfate ($K_2SO_4$). In addition, it combines potassium with sulfur (17%) which is also an essential plant nutrient.

Magnesium is an important element in the nutrition of animals and plants. It is a part of every animal cell.

Magnesium thiosulfate is a liquid source of Mg with up to 32% in concentration. Magnesium Thiosulfate is used in Industrial and Waste Treatment Applications, in Food Manufacturing Applications, Pharmaceutical Applications, and in Agricultural Applications.

Calcium is an essential plant nutrient. Calcium availability is essential in the biochemistry of plants and as it has been learned recently, in the nitrogen fertilizer efficiency of surface-applied urea.

Addition of soluble salts of calcium to urea can reduce the ammonia volatilization by as much as 90%. Calcium polysulfide, potassium polysulfide, calcium thiosulfate, magnesium thiosulfate, and blends thereof, are effective in inhibiting the catalytic effect of urease on the hydrolysis of urea to ammonia (U.S. Pat. No. 7,494,525 B2). Therefore, these compounds are effective in increasing the nitrogen delivery, or utilization, rate of urea-containing fertilizer nitrification.

Ammonium thiosulfate is a nitrogen and sulfur based liquid used commonly as 12-0-0-26 grade fertilizer in combination with urea ammonium nitrate (UAN), and ammonium polyphosphate (APP), and other fertilizers.

Ammonium thiosulfate has been used in conjunction with urea and urea-containing fertilizer products for the purpose of reducing nitrogen loss due to the nitrification of urea by bacteria or conversion to ammonia by the effect of urease enzyme. For example, it has been suggested that addition of ammonium thiosulfate to a urea ammonium nitrate fertilizer solution (UAN) can slow the urea hydrolysis rates after application to soil.

Thiosulfate is an important intermediate in microbial sulfur cycling in soils and sediments. It has been suggested that tetrathionate might be an inhibitor of soil urease by reacting with —SH groups in jackbean urease to form an S-sulpho derivative, as follows:

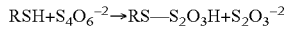

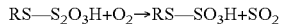

Thiosulfates like ammonium thiosulfates are also nitrification inhibitors, see e.g. Sallade and Sims, in Plant & Soil, December 1992.

The effect of soil pH on ammonia volatilization is minimal at low soil pH (about 3.5) but increases rapidly with increasing pH up to 8.5 (He et al., Soil Science, 164, 750-758, 1999). Calcium and magnesium polysulfides are soil acidifying conditioners on the one hand, and capture the ammonium carbonate forms from hydrolysis of urea plus form the related carbonates on the other hand. Carbonate precipitation and resultant soil pH depression reduce the rate of hydrolysis of added urea and, therefore, reduce ammonia loss. Besides soil conditioners, polysulfides are also a known source of Sulfur fertilizers.

Sulfites and other reduced sulfur compounds have been shown to inhibit urease activity ('Inhibition of Urease By Sulfur Compounds' by John Ambrose, et al, in Contributions from Gibbs Chemical Laboratory of Harvard University, September 1949).

Sulfite and bisulfites can react with the enzyme nickel site and prevent its activity (L. Mazzei et. al in *J. of Inorg Biochem., January* 2016). (Bi)sulfites further prevent oxygen-induced oxidation. As they are reducing agents, they can also prevent oxidation of NBPT to NBPO (which is the active mode of NBPT for urease inhibition) and hence they prolong the inhibitory effect of NBPT in the soil. And of course, (bi)sulfites are known fertilizers.

Thiosulfates, polysulfides and/or (bi)sulfites are thus known to have urease and/or nitrification inhibiting properties. Plus some of these compounds also protect NBPT from oxidative degradation. Also elemental sulfur can be used as nitrogen inhibitor (Soaud et al, J of Australian Crop Science, May 2011).

Thiosulfates, polysulfides and (bi)sulfites are often provided in the form of saturated salt solutions in water. Calcium and Magnesium thiosulfate fertilizers that are on the market contain about 75 wt % of water. Ammonium and Potassium thiosulfate fertilizers typically contain from about 40-50 wt % of water. Ammonium bisulfite by way of example is a 60-67% liquid solution with a pH about 5-5.8. These compounds were found difficult to dry by conventional drying techniques due to oxidation.

One of the main reasons is that these compounds and then in particular thiosulfates like calcium thiosulfates are very susceptible to thermal and/or oxidative degradation. Sulfur in general likes the [+6] oxidation state (like i.e., in $SO_4^{-2}$). This means that all of these species rather easily oxidize to $S^{+6}$. Formation of elemental sulfur can be another indicator for degradation of thiosulfates.

U.S. Pat. No. 5,618,658 (Fuji Hunt Photographic chemicals) describes methods to prepare a sulfur-free ammonium thiosulfate via spray draying, starting from about 60% ATS solution in water, with carbonate and sulfite components as stabilizers.

Dry thiosulfates are on the market (for instance for use in photography), but as fertilizers these products are often not very suitable. In addition, dry thiosulfates on the market are often very hygroscopic, causing storage problems when the products are not properly stored to avoid contact with moisture. Bulk storage of goods is then difficult.

With freeze drying more stable products can be obtained, but this is an expensive drying method. It is not commercially feasible to use freeze drying in the fertilizer industry.

Another challenge is to obtain products that are not too hygroscopic, that store well and have sufficient shelf-life. There is a demand for solid thiosulfates, polysulfides and/or (bi)sulfites in a stable form and easy to handle, plus compatible with other standard NPK fertilizers. There is also a demand for combined fertilizers (NS fertilizers) in a pre-mix form, that is end-user friendly and reduces the dosage errors. There is further an increasing demand for stabilized/protected urea-based fertilizers. Preferred are herein materials wherein N-protection of urea is provided through different kinds of mechanisms.

The inventors have found that the addition of urea-containing compounds [and in particular urea] to liquid thiosulfates helps prevent/reduce their air oxidation. Less of their degradation products such as sulfite and/or sulfate forms were forming during the drying process; meaning that the drying did not lead to significant product degradation. Plus, less elemental sulfur as degradation product seems to form. A similar approach proved beneficial for the drying of liquid polysulfides and/or liquid (bi)sulfites to form solid products useful as fertilizers.

SUMMARY OF THE INVENTION

Against this background we now provide solid fertilizers and ways of making these, whereby we aim to solve one or more of the above-mentioned problems.

A first aspect of the invention relates to aqueous solutions of thiosulfates, polysulfides and/or (bi)sulfites to which one or more urea-containing compounds [and in particular urea] are added. Further compounds like e.g. the compounds (c) and/or (d) as described below can be present. When these aqueous solutions are subjected to a drying process, then solid fertilizer-grade materials could be obtained without significant signs of product degradation.

Provided in the invention is hence an aqueous composition (I) suitable for preparing a solid thiosulfate-urea product and/or a solid polysulfide-urea based product and/or a solid (bi)sulfite-urea based product, said aqueous composition (I) comprising:
  one or more urea-containing compounds (a), preferably urea (a1),
  one or more liquid thiosulfates (b1') and/or liquid polysulfides (b2') and/or liquid (bi)sulfites (b3'),
  optionally, one or more urease (c1) and/or nitrification (c2) inhibitors that are different from compounds (b'), and/or
  optionally, one or more additives (d) different from any of the above, and/or,
  optionally, some extra water (e);
wherein the sum of the weight percentages (wt %) of compounds (a) through (e) present usually is at least about 80, 81, 82, 83, 84, or 85 wt %, preferably is at least about 86, 87, 88, or 89 wt %, more preferably at least about 90, 91, 92, 93, or 94 wt % or even at least about 95 wt %; and wherein the aqueous composition (I) comprises not more than about 5 wt % of UAN (Urea Ammonium Nitrate). Weight percentages (wt %) are herein relative to the total weight of the aqueous composition (I). Usually the amount of urea in said aqueous composition (I) is at least about 1 wt % and at most about 90, 89, 88, 87, or 86 wt %, preferably at most about 85 wt %. Preferably the amount of compounds (b) in said aqueous composition (I) is at least about 1, 1.5, 2, 2.5, 3, 3.5, 4 or 4.5 wt % or at least about 5 wt %.

In a particular embodiment of the invention, the amount of compounds (b) in said aqueous composition (I) is at least about 10, 11, 12, 13, 14, 15, 16, 17, 18 or 19 wt %, even at least about 20 wt %. Usually the amount of compounds (b) in said aqueous composition (I) is at most about 90, 89, 88, 87 or 86 wt %, preferably at most about 85 wt %. Of course, the sum of the weight percentages does not exceed 100 wt %.

Provided in the invention is hence an aqueous composition (I) suitable for preparing a solid thiosulfate-urea product and/or a solid polysulfide-urea based product and/or a solid (bi)sulfite-urea based product, said aqueous composition (I) comprising:
  one or more urea-containing compounds (a), preferably urea (a1),
  one or more liquid thiosulfates (b1') and/or liquid polysulfides (b2') and/or liquid (bi)sulfites (b3'),
  optionally, one or more urease (c1) and/or nitrification (c2) inhibitors that are different from compounds (b'), and/or
  optionally, one or more additives (d) different from any of the above, and/or,
  optionally, some extra water (e),
wherein the sum of the weight percentages (wt %) of compounds (a) through (e) present usually is at least about 80, 81, 82, 83, 84 or 85 wt %, preferably is at least about 86, 87, 88 or 89 wt %, more preferably at least about 90, 91, 92, 93 or 94 wt %, even at least about 95 wt %; and wherein the aqueous composition (I) comprises not more than about 5 wt % of UAN. Weight percentages (wt %) are herein relative to the total weight of the aqueous composition (I). In this embodiment, the amount of compounds (b) in said aqueous composition (I) usually is at least about 7, 8, 9, 10, 11, 12, 13 or 14 wt %. In a particular embodiment, this amount is at least about 15, 16, 17, 18, 19 or 20 wt %. In particular embodiments of the invention, the amount of compounds (b) is at least about 25, 30, 35, 40, 45 or 50 wt %. Usually the amount of compounds (b) is at most about 92, 91 or 90 wt %. In this embodiment the amount of urea (a1) is at least about 1, 2, 3 or 4 wt %, at least about 5, 6, 7, 8 or 9 wt %, even at least about 10 wt %. Of course, the sum of the weight percentages does not exceed 100 wt %.

Compounds (a) can be selected from urea (a1, $CH_4N_2O$, MW about 60) and/or from urea-aldehyde products (a2) and/or urea-triazone compounds (a3), though 'urea' and more in particular 'dry' or 'solid' urea is preferred. Aqueous compositions (I) of the invention generally are substantially free from UAN. By substantially free is meant that they comprise less than about 1 wt % of UAN. Preferably they comprise less than about 0.5 wt %, more preferably less than about 0.1 wt % of UAN, relative to the total weight of the aqueous composition (I).

In general the ratio of compounds (a) to compounds (b), and more in particular the ratio of urea (a1) to compounds (b), in the aqueous compositions (I) of the invention is from 1:99 to 99:1, or from 1.5:98.5 to 98.5:1.5, or from 2:98 to 98:2. Further, preferably, and in particular when compound (b) comprises or consists of ammonium thiosulfate, the ratio of compounds (a) to compounds (b) is from 5:95 to 95:5, from 10:90 to 90:10, from 15:85 to 85:10 or from 15:85 to 85:15. A preferred compound (a) is urea (a1, $CH_4N_2O$, MW about 60). Preferably the ratio of urea to compounds (b) is from 5:95 to 95:5, from 10:90 to 90:10, from 15:85 to 85:10 or from 15:85 to 85:15. In some embodiments of the invention this ratio will be from 1:4 to 4:1, preferably from 1:3 to 3:1 or from 2:3 to 3:2. In a particular embodiment of the invention this ratio is from 1:2 to 2:1. In a most particular embodiment of the invention compounds (a) and (b) are present in equal amounts.

Aqueous compositions (I) of the invention are easy to prepare by contacting and mixing the different compounds. Normally the amount of water present in the liquid thiosulfates and/or the liquid polysulfides and/or the liquid (bi)sulfites allows a thorough mixing of the different compounds. When high amounts of compounds (a) and/or of compounds (b) are being used, then it may be useful to add some extra water.

In general, the total amount of water present in aqueous compositions (I) of the invention is from about 5 wt % to about 75 wt %, more preferably from about 10 wt % to about 70 wt %, more preferably from about 15 wt % to about 65 wt %.

By subjecting aqueous compositions (I) of the invention to a drying process (e.g. by evaporating the water), solid products with a shelf life of at least about 6 months, even up to about 1 year could be obtained. In addition, the products as such obtained were highly suitable for use as fertilizers.

A second aspect of the invention relates to 'dry', 'dried' or 'solid' products/compositions that can be obtained in accordance with the invention, obtained via this process or in any other suitable way.

Provided in the invention is in particular a thiosulfate-urea based product (IIa) and/or a polysulfide-urea based product (IIb) and/or a (bi)sulfite-urea based product (IIc) comprising:
  one or more urea-containing compounds (a),
  one or more compounds (b),
  optionally, one or more urease (c1) and/or nitrification (c2) inhibitors that are different from compounds (b), and/or
  optionally, one or more additives (d) that are different from any of the above compounds;
wherein the amount of water (e) in the product (II) is less than about 10 wt %, preferably less than about 5 wt %;
wherein compounds (a) are selected from urea (a1) and/or from urea-aldehyde products (a2) and/or from urea-triazone compounds (a3); and
wherein compounds (b) are selected from thiosulfates (b1) and/or from polysulfides (b2) and/or from (bi)sulfites (b3);
said product (II) comprising, relative to its total weight, at least about 1 wt %, preferably at least about 2 wt % of urea and at most about 99, 98, 97 or 96 wt % of urea. Preferably, the amount of urea is at most about 95, 94, 93, 92, or 91 wt %. In a particular embodiment, in particular when compound (b) comprises or is ammonium thiosulfate, the amount of urea present in the products (II) is at most about 90, 89, 88, 87 or 86 wt %, even at most about 85 wt %. Preferably compounds (b) are herein present in an amount of at least about 1, 1.5, 2, 2.5, 3, 3.5, 4 or 4.5 wt %, at least about 5 wt %. Preferably compounds (b) are herein present in an amount of at most about 95, 94, 93, 92 or 91 wt %. Preferably, compounds (b) are present in an amount of at most about 90, 89, 88, 87, 86 or at most about 85 wt %. Weight percentages are herein relative to the total weight of the product (II) and of course the sum of the weight percentages does not exceed 100 wt %.

Provided in the invention is in particular also a thiosulfate-urea based product (IIa) and/or a polysulfide-urea based product (IIb) and/or a (bi)sulfite-urea based product (IIc) comprising:
  one or more urea-containing compounds (a),
  one or more compounds (b),
  optionally, one or more urease (c1) and/or nitrification (c2) inhibitors that are different from compounds (b), and/or
  optionally, one or more additives (d) that are different from any of the above compounds;
wherein the amount of water (e) in the product (II) is less than about 10 wt %, preferably less than about 5 wt %;
wherein compounds (a) are selected from urea (a1) and/or from urea-aldehyde products (a2) and/or from urea-triazone compounds (a3); and
wherein compounds (b) are selected from thiosulfates (b1) and/or from polysulfides (b2) and/or from (bi)sulfites (b3);
said product (II) comprising at least about 6, 6.5, 7, 7.5, 8, 8.5, 9, 9.5 or 10 wt % of compounds (b). Preferably the amount of compounds (b) is then at most about 95, 94, 93, 92 or 91 wt %. More preferably this amount is at most about 90, 89, 88, 87 or 86 wt %, more preferably at most about 85 wt %. Preferably the amount of urea herein is at least about 1, 1.5, 2, 2.5, 3, 3.5, 4 or 4.5 wt %, even at least about 5 wt %. Preferably urea herein is present in an amount of at most about 94, 93, 92 or 91 wt %. In a particular embodiment, in particular when compound (b) comprises or is ammonium thiosulfate, the amount of urea present in the products (II) is at most about 90, 89, 88, 87 or 86 wt %, even at most about 85 wt %. Weight percentages are herein relative to the total weight of the product (II) and of course the sum of the weight percentages does not exceed 100 wt %.

Provided in the invention is in particular a thiosulfate-urea based product (IIa) and/or a polysulfide-urea based product (IIb) and/or a (bi)sulfite-urea based product (IIc) comprising:
- one or more urea-containing compounds (a),
- one or more compounds (b),
- optionally, one or more urease (c1) and/or nitrification (c2) inhibitors that are different from compounds (b), and/or
- optionally, one or more additives (d) that are different from any of the above compounds;

wherein the amount of water (e) in the product (II) is less than about 10 wt %, preferably less than about 5 wt %; wherein compounds (a) are selected from urea (a1) and/or from urea-aldehyde products (a2) and/or from urea-triazone compounds (a3); and
wherein compounds (b) are selected from thiosulfates (b1) and/or from polysulfides (b2) and/or from (bi)sulfites (b3); wherein compounds (a) and (b) are spread substantially homogeneously throughout the product (II); wherein in general the amount of urea in the product (II) is at least about 1 wt % and at most about 99, 98, 97, 96, 95, 94, 93, 92, or 91 wt %. Typically, however, the amount of urea in the product (II) is at most about 90, 89, 88, 87, 86 wt % or even at most about 85 wt %, when compound (b) comprises or is ammonium thiosulfate. Preferably compounds (a) and (b) in products (II) of the invention are spread substantially homogeneously throughout the product (II). Preferably further, said product (II) comprises at least about 10, 10.5, 11, 11.5, 12, 12.5, 13, 13.5, 14, 14.5, or 15 wt % of compound (b), when compound (b) is ammonium thiosulfate. Preferably further, said product (II) comprises at most 90, 89.5, 89, 88.5, 88, 87.5, 87, 86.5, 86, 85.5, or 85 wt % of urea, when compound (b) is ammonium thiosulfate. When compound (b1) is ammonium thiosulfate, then the ratio of compounds (a) to compounds (b) is typically from 10:90 to 90:10, from 15:85 to 85:15 or from 20:80 to 80:20.

In all of the above, the urea-containing compound (a) preferably is selected from urea itself (a1, $CH_4N_2O$, MW about 60) and/or from urea-aldehyde products (a2) and/or from urea-triazone compounds (a3). In a preferred embodiment of the invention, the urea-containing compound includes or is urea (a1). Preferably it is urea (a1).

The use of urea (a1) has different advantages: (1) urea is a source of nitrogen nutrients, so the products find use as fertilizer, (2) urea is cheap and readily available, (3) surprisingly, urea helps prevent the oxidation/degradation of the liquid fertilizers, and (4) surprisingly, urea seems to act also as a processing aid during the drying process. Surprisingly, less oxidation by-products form when compounds (b) are dried in the presence of urea-containing compounds, more in particular 'urea'.

In all of the above, the term 'thiosulfates' refers to the active ingredient itself, and not the aqueous solution. Impurities possibly present in the 'thiosulfate' however are included. The same applies for the term 'polysulfides' and the term '(bi)sulfites'. Thiosulfates (b1), polysulfides (b2) and (bi)sulfites (b3) are generally provided in the form of a solution or suspension in water. These solutions most often are saturated solutions, meaning that the active ingredient is present dissolved or dispersed therein in the highest possible amount. The solutions in water of the thiosulfates, polysulfides and (bi)sulfites are referred to as compounds (b1'), (b2') and (b3') respectively. Removal of the water contained in these compounds (b'), and possibly in other compounds present, will lead to the 'dried' or 'dry' or 'solid' products/compositions of the invention.

In general the ratio of compounds (a) to compounds (b), and more in particular the ratio of urea (a1) to compounds (b), in products (II) of the invention is from 1:99 to 99:1, from 1.5:98.5 to 98.5:1.5, or from 2:98 to 98:2. Further preferably, and in particular when compound (b) comprises or is ammonium thiosulfate, the ratio of compounds (a) to compounds (b) is from 5:95 to 95:5, from 10:90 to 90:10, from 15:85 to 85:10 or from 15:85 to 85:15 or from 20:80 to 80:20. In some embodiments of the invention this ratio will be from 1:4 to 4:1, preferably from 1:3 to 3:1 or from 2:3 to 3:2. In a particular embodiment of the invention this ratio is from 1:2 to 2:1. In a most particular embodiment of the invention compounds (a) and (b) are present in equal amounts.

A third aspect of the invention relates to possible drying processes that can lead to solid products of the invention. Broadly, there is provided a process for making a thiosulfate-urea based product (IIIa) and/or a polysulfide-urea based product (IIIb) and/or a (bi)sulfite-urea based product (IIIc) with low water content, said process comprising the steps of:
- (i) Providing a mixture of one or more urea-containing compounds (a) with one or more compounds (b), said mixture containing water (e),
- (ii) Optionally, adding one or more compounds (c) and/or (d) as recited,
- (iii) Optionally, adding extra water (e),
- (iv) Obtaining a substantially homogeneous mixture,
- (v) Removing water from this mixture until a product (III) is obtained with a water content of at most about 10 wt %, more preferably at most about 5 wt %;

wherein compounds (a) are selected from urea (a1) and/or from urea-aldehyde products (a2) and/or from urea-triazone compounds (a3); and
wherein compounds (b) are selected from thiosulfates (b1) and/or from polysulfides (b2) and/or from (bi)sulfites (b3); said product (III) comprising at least about 1 wt %, preferably at least about 2 wt % of urea and at most about 99, 98, 97 or 96 wt % of urea. Preferably the amount of urea is at most about 95, 94, 93, 92, or 91 wt %. In a particular embodiment, the amount of urea present in the products (III) is at most about 90, 89, 88, 87 or 86 wt %, even at most about 85 wt %. Preferably compounds (b) are herein present in an amount of at least about 1, 1.5, 2, 2.5, 3, 3.5, 4 or 4.5 wt %, even at least about 5 wt %. Preferably compounds (b) are herein present in an amount of at most about 95, 94, 93, 92 or 91 wt %. Preferably compound (b) are present in an amount of at most about 90, 89, 88, 87 or 86 wt %, even at most about 85 wt %. Weight percentages are herein relative to the total weight of the product (III) and of course the sum of the weight percentages does not exceed 100 wt %.

Broadly, there is also a process for making a thiosulfate-urea based product (IIIa) and/or a polysulfide-urea based product (IIIb) and/or a (bi)sulfite-urea based product (IIIc) with low water content, said process comprising the steps of:
- (i) Providing a mixture of one or more urea-containing compounds (a) with one or more compounds (b), said mixture containing water (e),
- (ii) Optionally, adding one or more compounds (c) and/or (d) as recited,
- (iii) Optionally, adding extra water (e),
- (iv) Obtaining a substantially homogeneous mixture,
- (v) Removing water from this mixture until a product (III) is obtained with a water content of at most about 10 wt %, more preferably at most about 5 wt %, wherein compounds (a) are selected from urea (a1) and/or from urea-aldehyde products (a2) and/or from urea-triazone compounds (a3); and wherein compounds (b) are selected from thiosulfates (b1) and/or from polysulfides (b2) and/or from (bi)sulfites (b3); said product (III) comprising at least about 6, 6.5, 7, 7.5, 8, 8.5, 9, 9.5 or 10 wt % of compounds (b). Preferably the amount of compounds (b) is then at most about 95, 94, 93, 92 or 91 wt %. More preferably this amount is at most about 90, 89, 88, 87 or 86 wt %, more preferably at most about 85 wt %. Preferably the amount of urea herein is at least about 1, 1.5, 2, 2.5, 3, 3.5, 4 or 4.5 wt %, even at least about 5 wt %. Preferably urea herein is present in an amount of at most about 93, 92 or 91 wt %. Preferably compound (b) are present in an amount of at most about 90, 89, 88, 87 or 86 wt %, even at most about 85 wt %. Weight percentages are herein relative to the total weight of the product (III) and of course the sum of the weight percentages does not exceed 100 wt %.

The processes of the invention often further contain one or more of the following steps: a breaking step, a grinding step, a granulation step, a sieving step, a final drying step, a polishing step, a cooling step and/or a packaging step. The term 'granulation' is not to be interpreted in a restrictive manner, and can include a prilling process, a pelleting process, a compounding process, a fluidized bed granulation, a drum granulation, a falling curtain granulation, an agglomeration granulation, a spherodizer process, spray drying and compacting, vortex granulation, or any other suitable granulation process or means used in the art to form solid fertilizer granules, prills, pellets, tablets, etc.

In a particular embodiment, an aqueous composition (I) of the invention is provided from which water is removed by evaporation, with or without vacuum. By applying a vacuum to the aqueous solution (I) of the invention, temperatures can be kept below about 100, 95 or 90° C. If no vacuum is applied, then temperatures of at most about 130, 120, 115 or even 110° C. suffice to obtain a solid particulate product. Even at these temperatures products with an excellent shelf life were obtained. The higher temperatures did not lead to substantial discoloration and/or degradation of the compounds (b). Often the solids remaining after evaporation, were further dried at ambient temperature to remove last bits of water. If needed, then the particulate products obtained can be crushed and/or sieved to obtain granulates of a particular size.

An alternative way to make products (II) and (III) of the invention is to add compounds (b) to a urea melt (melt temperature of urea is about 133° C.). This can be done in various ways, compounds (b) can be added in solid form. The solid compound (b) in a preferred embodiment is a compound (II) and/or (III) of the invention. It is also possible to add liquid compounds (b') to the urea melt. A partial or full drying can be done on the liquid compounds (b') to adding of the urea melt. In yet another embodiment on the invention, an aqueous composition (I) according to the invention is added to the urea melt. When liquid compounds (b') and/or aqueous composition (I) according to the invention are added to the urea melt, then it may be necessary to remove part of the water, before the urea melt containing compounds (a) and possible compounds (c) and/or (d) prior to granulation. This can yield products having at least compounds (a) and (b) spread more or less homogeneously over the solid product obtained. Alternatively, this can lead to solid products wherein compounds (a) are present primarily in the outer layers of the of the product, like in a coating.

Yet another way to make products (II) and (III) of the invention is to add solid compounds (b), liquid compounds (b') and/or an aqueous solution (I) of the invention to a liquid urea at a temperature of e.g. at least about 130, 135, 140 or 145° C., and to process these into granulates via a drum coating and/or a drum coating that has some heating sufficient to remove water. Due to their high re-solubility in water, it is even possible to add solid products (II) or (III) of the invention via spray drying. This can lead to solid products wherein compounds (a) are present primarily in the outer layers of the product, or wherein compounds (a) are present in a coating that is provided onto a urea granule.

Yet another way to make compounds (II) or (III) of the invention, is to add materials of the invention to a liquid urea in e.g. a drum granulator, preferably one equipped with a spray drier.

When compounds (b) are added to a hot urea (molten or liquid), then it may be recommended to keep the retention time short and/or to add some additives that lower the urea melt temperature. Preferably less than about 60, 30 or 15 minutes pass between adding of the compounds (b) to the hot urea and granulation. Even more preferred is to have a retention time of at most about 60, 50, 40, 30, 20 or even 15 seconds.

It is preferred that the temperature of the mixture containing compounds (a) and (b) and does not exceed about 250, 245, 240, 235 or about 230° C., preferably does not exceed about 220, 210, 205 or about 200° C.

Preferably the temperature of the hot urea (molten or liquid) is below about 230° C., more preferably below about 200° C. when adding compounds (b). Preferably this temperature is at most about 195, 190, 185, 180 or even at most about 175° C. An example of an additive that can be used to lower the melt temperature of urea is e.g. the urea-formaldehyde conditioning agent UF80 (a mixture of urea/formaldehyde/water in a ratio of 23/57/20, from Dynea).

An advantage of the processes of the invention is that they allow the flexibility of using operating temperatures that go from low (at most about 115° C., even lower under vacuum) to minimize product degradation, to high (preferably about 250° C., more preferably about 230° C. max) to optimize energy efficiency and equipment sizing still with low product degradation.

Also NBPT is temperature sensitive and may benefit from the above recommendations.

Yet another way to make products (II) or (III) of the invention is through freeze drying. Alternative drying processes that may be used, depending on the amount of water present, include but are not limited to drying in a granulation drum, tumble drying, fluidized bed drying, spray drying, or the drying during pelletizing.

Products (II) and (III) of the invention can vary widely in composition and have various uses:

(1) Products high in urea content (preferably those with an N content 40 wt %) can be used directly as urea fertilizer. If needed they can be blended with standard urea. These materials are suitable for blending with standard NPK fertilizers.

(2) Products low in urea content and low in thiosulfate and/or polysulfide and/or (bi)sulfite content can be used as carrier materials for nitrogen stabilizers like NBPT and/or DCD. Re-solubilized in water, they can be added to standard liquid fertilizers like e.g. UAN (Urea Ammonium Nitrate). Or they can be used as an intermediate product to add to a urea melt (see below).

(3) Products high in urea content and high in thiosulfate and/or polysulfide and/or (bi)sulfite content can be used as such as solid fertilizers, or they may be combined with some other solid fertilizers. Due to a high solubility in water they can also be blended with liquid fertilizers.

The solid products (II) or (III) can be provided in many different forms and sizes going from hydrate to crystals, powder, pearls, granule, prill, pellet, pastille, tablet form of a granule, a prill, pellet, tablet, etc. They can be stored or transported in bulk or they can be packed in bags, containers, cubicles, etc. of various sizes that preferably are well sealed. Though the solid products of the invention are less hygroscopic in nature then the products sold for photographic applications, it is recommended to avoid contact with moisture and/or atmospheric gasses such as oxygen, nitrogen, etc., or to provide a suitable moisture-repellent coating. Optimally, driers or desiccants like a silica gel or anti-caking agents are added to further improve the product's shelf life. Preferably products (II) and (III) of the invention are properly packaged in sealed containers, bags, etc., with little to no head space (e.g. head space of less than about 1%).

Products (II) and (III) of the invention can also vary widely in composition. In an embodiment of the invention (any of the above), these products contain compounds (c). As compounds (b) can exert urease and/or nitrification inhibiting effects, the addition of compounds (c) is optional. And if the aim is not to provide a stabilized urea, then compounds (c) are optional anyhow. In a particular embodiment of the invention, products (II) and (III) of the invention do not comprise any NBPT, and preferably also no DCD.

Products (II) and (III) were found to contain little to no degradation products of compounds (b). Generally products (II) and (III) of the invention contain less than about 5 wt % of oxidation by-products of compounds (b) like the corresponding sulfates and/or sulfites, or like elemental sulfur.

Products (II), and (III) of the invention have a wide applicability but are in particular highly suited for use in or as fertilizers. They are generally compatible with standard liquid and/or solid fertilizers or fertilizer ingredients.

A fourth aspect of the invention hence relates to a fertilizer (IV) comprising a product (II) or (III) of the invention. In one embodiment of the invention the fertilizer is a liquid fertilizer. In another embodiment of the invention the fertilizer is a solid fertilizer.

A fifth aspect of the invention: Products (II) and (III) of the invention can serve as liquid carriers or as solid carriers for nitrogen inhibitors like NBPT and/or DCD. Such carrier materials for NBPT and/or DCD can be added to liquid and/or to solids fertilizers. An advantage of materials of the invention is that they require less or even no organic solvents like NMP (N-methyl-2-pyrrolidone), DMSO (dimethyl sulfoxide), etc.

Preferably products (II) and (III) of the invention are re-dissolved in water or any other suitable liquid, possibly UAN, prior to their addition to a liquid fertilizer.

A sixth aspect of the invention relates to a protected urea containing at least one thiosulfate (b1) and/or at least one polysulfide (b2) and/or at least one (bi)sulfite (b3) in an amount that they exert urease and/or nitrification inhibitory effects. The inventors also found that a urea-containing material (in particular urea) is a good carrier for nitrogen inhibitors such as NBPT (N-(n-butyl)-thiophosphoric triamide) and/or DCD (dicyandiamide). So these can be easily added if wanted. The presence of a urea-containing compounds (in particular urea) makes that the amount of organic solvents otherwise used as liquid carrier materials for NBPT and/or DCD can hereby be significantly reduced, even avoided.

A still further aspect of the invention relates to the use of an aqueous composition (I) of the invention and/or the use of a product (II) or (III) of the invention for adding to hot urea, like a urea melt. Preferably the urea granules as such produced also comprise NBPT and/or DCD, though the presence of the latter is optional as the compounds (b) can exert sufficient urease and/or nitrification inhibitory effects. Yet another aspect of the invention use of aqueous composition (I) of the invention and/or the use of a product (II) or (III) of the invention the coating of granular urea.

A last aspect relates to a kit-of-parts comprising a product (II) and/or (III), together with a nitrogen stabilizing composition that contains NBPT and/or DCD, and optionally, some directions on how to mix and apply these materials as liquid or solid fertilizer. Compounds (II) and/or (III) then typically contain no compounds (c). An addition of a dye to the different products and/or solutions can then be handy to help monitor dosage.

DETAILED DESCRIPTION OF THE INVENTION

Addition of Urea to Thiosulfates/Polysulfides/(Bi)Sulfites and Vice Versa

A first aspect of the invention relates to an aqueous composition (I) having a urea-containing compound (a) added to a liquid thiosulfate (b1') and/or a liquid polysulfide (b2') and/or a liquid (bi)sulfite (b3'). The aqueous composition (I) of the invention can further contain urease inhibitors (c1) and/or nitrification inhibitors (c2) and/or additives (d) like dyes, colorants, buffers, surfactants, stabilizers, etc. Aqueous compositions (I) of the invention are simple and cheap materials that can be used for the making of solid thiosulfates, polysulfides and/or (bi)sulfites, for the making of protected urea, and they can serve as carrier materials for nitrogen inhibitors like NBPT and/or DCD. Below, the aqueous compositions (I) of the invention are described as well as their constituents.

A second aspect of the invention relates to products (II) or (III) as shortly described above and their ways of making.

Throughout the invention unless specified otherwise, the following compounds are used as described and in the amounts as specified. Unless specified otherwise, weight percentages (wt %) are always relative to the total weight of the product/composition in question. For compounds (c1), and more in particular NBPT, weight percentages (wt %) are relative to the total amount of urea nitrogen present in the product/composition. For compounds (c2), and more in particular DCD, weight percentages (wt %) are relative to the total amount of urea & ammonium nitrogen present in the product/composition.

Compounds a

By an 'urea-containing compound' (a) is meant herein a compound that contains a certain amount of free urea or a urea-derivative. This term in particular refers to urea itself (a1, $CH_4N_2O$, MW around 60) and/or to a urea-aldehyde product (a2) and/or to a urea-triazone compound (a3). Preferred in the context of the invention is urea ($CH_4N_2O$, MW around 60). Depending on how the products of the invention are made the 'urea' can be a 'dry urea' (a11), a 'liquid urea' (a12) and/or an 'urea melt' (a13). The use of 'dry' or 'solid' urea is often preferred. Any type of dry urea can be used including but not limited to urea granules, prills, pellets, pastilles, tablets, pearls, powders, crystals, etc.—as all of these urea forms are readily soluble in water. The term 'liquid urea' as used herein, refers to solutions of urea in water. Liquid urea products on the market in general contain from about 40-60 wt % of urea in water. The term 'liquid urea', in the context of the present invention, does not cover a 'molten urea' or an 'urea melt', having urea in molten form at elevated temperatures (above about 130° C. typically).

Preferably a 'urea' is used with a purity of at least about 50%, preferably at least about 70%, more preferably at least about 90% and most preferably at least about 95%. Preferably, the urea has a purity of at least about 99, 99.1, 99.2, 99.3, 99.4, 99.5, or 99.6 or up to about 99.7%. Dry urea can have up to about 1 wt % Biuret.

Compounds b and b'

Compounds (b) in the context of the invention can be thiosulfates and/or polysulfides and/or (bi)sulfites. In an embodiment of the invention, compounds (b) include or are (bi)sulfites and/or polysulfides. In another embodiment of the invention, compounds (b) include or are thiosulfates and/or polysulfides. Most preferred are compounds that include or are thiosulfates. Compounds (b) are usually provided as solutions or dispersions in water. The latter are herein referred to as compounds (b').

Thiosulfates

Thiosulfates are typically provided in the market as liquid thiosulfates (b1') containing the active compound (b1) in water. In the invention, thiosulfate solutions are preferably used at their maximum concentrations. The thiosulfates in thiosulfate solutions are in general salts of alkali metals, alkali earth metals, and transition metals such as zinc, iron, manganese and/or copper. Preferred in the invention are ammonium thiosulfates and/or potassium thiosulfates and/or calcium thiosulfates and/or magnesium thiosulfates and/or manganese thiosulfates and/or iron thiosulfates. Preferred for use in the invention are ammonium thiosulfates and/or potassium thiosulfates and/or calcium thiosulfates and/or magnesium thiosulfates. More preferred are ammonium thiosulfates and/or magnesium thiosulfates and/or calcium thiosulfates. Magnesium thiosulfates and/or calcium thiosulfates have the strongest urease inhibitory effect. Thus most preferred are magnesium thiosulfates and/or calcium thiosulfates. Potassium thiosulfate can be used, but then preferably in combination with compounds (c). Ammonium thiosulfate can be used too but preferably together with some extra iron and/or molybdenum to increase its efficiency.

Thiosulfate based liquid fertilizers (b1') are well known, and comprise for example:
  Potassium thiosulfate, which is a 50% aqueous solution (grade 0-0-25-17S).
  Magnesium thiosulfate, which is a 5-25% aqueous solution (grade 0-0-0-10S-4Mg)
  Calcium thiosulfate, which is a 5-25% aqueous solution (grade 0-0-0-10S-6Ca)
  Ammonium thiosulfate, which is a 50-60% aqueous solution (grade 12-0-0-26S).

Polysulfides

Also polysulfides are typically provided in the market as liquid polysulfides (b2') containing the active compound (b2) in water. Also polysulfide solutions are preferably used at their maximum concentrations. Polysulfides (b2) are preferably chosen from calcium polysulfides and/or potassium polysulfides and/or sodium polysulfides and/or iron polysulfides. Preferred are calcium polysulfides and/or potassium polysulfides and/or ammonium polysulfides. Particularly preferred are calcium polysulfides and/or potassium polysulfides because of their good urease inhibiting effect.

(Bi)sulfites

Also (bi)sulfites are typically provided in the market as liquid (bi)sulfites (b3') containing the active compound (b3) in water. By the term '(bi)sulfite' is meant to designate sulfites, bisulfites and mixtures of both. Also (bi)sulfite liquid solutions are preferably used as their maximum concentration. Examples of compounds (b3) that can be used in the context of the invention are potassium sulfite, potassium bisulfite, ammonium sulfite and/or ammonium bisulfite and/or iron sulfite and/or iron bisulfite. Preferred are potassium sulfite, potassium bisulfite, ammonium sulfite and/or ammonium bisulfite. More preferred are potassium sulfite and/or potassium bisulfite.

In an embodiment of the invention, compounds (b) include or are selected from thiosulfates (b1). In another embodiment of the invention, compounds (b) include or are selected from polysulfides (b2). In another embodiment of the invention, compounds (b) include or are selected from (bi)sulfites (b3). Mixture of any of these can also be used. In a particular embodiment of the invention, at least two compounds (b) are present.

Optional Compounds c

Optionally, urease inhibitors (c1) like NBPT and/or nitrification inhibitors (c2) like DCD can be added to products of the invention without negative impact on the stability of the thiosulfates and/or polysulfides and/or (bi)sulfites during drying. They can help protect and stabilize the urea present in products (I), (II) and (III) of the invention.

N-(n-butyl)-thiophosphoric triamide (NBPT) and phenylphosphorodiamidate (PPD) are two examples of urease inhibitors that are widely studied and/or used. NBPT is commercially available under the trademark Agrotain® available from Agrotain International, St. Louis, Mo. (Koch). Recently KOCH has been launching DUROMIDE™ technology based on new powerful urease inhibitors like ANVOL™.

Dicyandiamide (DCD) and 2-chloro-6-(trichloromethyl)-pyridine (Nitrapyrin) are two examples of widely used nitrification inhibitors.

The urease inhibitor (c1) can be a liquid at room temperature, a liquid at elevated temperature, or a solid which is dissolved, dispersed or suspended into a liquid carrier. The same for the nitrification inhibitor (c2).

An advantage of the system and materials of the invention is that urease (c1) and/or nitrification (c2) inhibitors can be added as such. By 'as such' is meant that they are added in dry or solid form, without being dissolved or diluted in a suitable liquid or solid carrier as is standard in the art. In the invention less or even no organic solvents are needed. Preferably the NBPT used has a purity of at least about 90 wt %, preferably at least about 95, 96, 97, 98 or 99 wt %. Highly pure grades are available, for instance in powder from Sunfit Chemical Co. (China).

In an embodiment of the invention, a urease inhibitor (c1) is used that includes or is NBPT. In the same or another embodiment, a nitrification inhibitor (c2) is used that includes or is DCD. Alternatively, or in addition thereto, other types of urease and/or nitrification inhibitors as described in the art can be added too if wanted.

In the invention, compound (c1) and (c2) are different from each other and differ from the compounds (b) being used/present.

Optional Compounds d

Additives or additional compounds (d) that optionally may be present in the products and the compositions of the invention, include but are not limited to dyes, colorants, odor masking agents, flow aids, processing aids (such as, for example, a granulating binder), conditioning agents (like e.g. mineral oil), anti-caking agents (such as, for example, lime, gypsum, silicon dioxide, kaolinite and/or PVA), hardening agents (such as, for example, UF 85), surfactants, silicas, thickeners, viscosity modifiers, pH control agents, buffers, copper, molybdenum, elemental sulfur, additives to lower the urea melt temperature, bactericides, etc. Compounds (d) in the invention are different from any of compounds (a), (b), (c), and (e).

Ways of Making Products (II) and (III) of the Invention

Processes of the invention for making compounds (II) or (III) of the invention preferably comprise at least the following steps:
(i) Providing a mixture of one or more urea-containing compounds (a) with one or more compounds (b), said mixture containing water (e),
(ii) Optionally, adding one or more compounds (c) and/or (d) as recited,
(iii) Optionally, adding extra water (e),
(iv) Obtaining a substantially homogeneous mixture, and
(v) Removing water from this mixture until a product (II) or (III) is obtained with a water content of at most about 10 wt %, more preferably at most about 5 wt %.

Processes of the invention often further contain one or more of the following additional steps: a breaking step, a grinding step, a granulation step, a sieving step, a final drying step, a polishing step, a cooling step and/or a packaging step.

In a particular embodiment, an aqueous composition (I) of the invention is provided from which water is then removed by evaporation, with or without vacuum. By applying a vacuum to the aqueous solution (I) of the invention, temperatures can be kept below about 100° C. which is beneficial for product stability, below about 95° C., below about 90, 89, 88, 87, or 86° C., or below about 85, 84, 83, 82, or 81° C., or even below about 80° C. If no vacuum is applied, then temperatures of at most about 130° C., at most about 120° C., even at most about 115, 114, 113, 112, 110 or 110° C. suffice to obtain a solid particulate product. Even at these temperatures products with excellent shelf life were obtained. The higher temperatures did not lead to substantial discoloration and/or degradation of the compounds (b). Often the solids remaining after evaporation, were further dried at ambient temperature to remove last bits of water. If needed then the particulate products obtained can be crushed and/or sieved to obtain granulates of a particular size.

In this embodiment, urea is preferably added to liquid thiosulfates (b1') and/or to liquid polysulfides (b2') and/or liquid (bi)sulfites (b3'). To facilitate dissolution of urea, the liquid compounds (b') are preferably pre-heated to a temperature of at least about 40, 45 or 50° C. Optionally one or more compounds (c1) and/or (c2) and/or (d) can be added.

In this embodiment, preferably 'dry' urea is used, though in some case the use of a liquid urea as available on the market can be handy too. This for instance, if high amounts of compounds (a) and/or of compounds (b) are used. An alternative is to use a 'dry' urea and to add a minimal amount of extra water, just enough to allow a sufficient mixing of the compounds present.

An alternative way to make products (II) and (III) of the invention is to add compounds (b) to a urea melt (melt temperature of urea is about 133° C.). This can be done in various ways, compounds (b) can be added in solid form. The solid compound (b) in a preferred embodiment is a compound (II) and/or (III) of the invention. It is also possible to add liquid compounds (b') to the urea melt. In yet another embodiment on the invention, an aqueous composition (I) according to the invention is added to the urea melt.

When liquid compounds (b') and/or aqueous composition (I) according to the invention are added to the urea melt, then it may be necessary to remove at least part of the water prior to granulation. This can yield products having at least compounds (a) and (b) spread substantially homogeneously within the solid particulate being produced. Alternatively, this can lead to solid products wherein compounds (b) are present primarily in the outer layers of the solid particulate being produced, like in a coating.

Yet another way to make products (II) and (III) of the invention is to add solid compounds (b), liquid compounds (b') and/or an aqueous solution (I) of the invention to a liquid urea at a temperature of e.g. least about 130, 135, 140 or 145° C. and to process these into granulates via a drum coating and/or a drum coating that has some heating sufficient to remove water. Due to their high solubility in water, it is even possible to add solid products (II) or (III) of the invention via spray drying. This can lead to solid products wherein compounds (a) are present primarily in the outer layers of the of the product, or wherein compounds (a) are present in a coating that is provided onto a urea granule.

In a preferred embodiment of the invention, any urea granule produced this way further contains a coating that provided moisture-repellent and/or anti-caking properties. Examples of suitable anticaking and/or moisture repellent coatings are vegetable oil (rapeseed or neem), paraffin and Novoflow anti-caking and/or moisture repellence agent s (Novochem Fertilizer Additives, The Netherlands).

When NBPT is being present in combination with elemental sulfur, then it may be advantageous to have some stabilizers present like the alkaline or alkaline forming inorganic or organic compounds disclosed in WO 2018/069486. Otherwise the use of stabilizers is not really needed.

In some occasions it may be necessary to add some extra water, for instance if high amounts of compounds (a) and/or (b) are used so that the mixture becomes viscous or sticky. A homogeneous mixture is generally obtained via an adequate mixing or stirring. The time needed to obtain a homogeneous mixture may vary from one product to another.

Preferably the mixture is heated to a temperature of for instance from about 40° C. to about 70° C. to facilitate dissolution of the urea-containing compound (in particular urea) added. The urea-containing compound (in particular urea) preferably is added slowly, either continuously or in different steps. In general a heating to at least about 40° C., preferably at least about 45° C. (oil or heating fluid temperature) suffices to have compounds (a) dissolve.

Then the heating is gently increased to start water removal in particular water evaporation.

Removal of water (e.g. via evaporation) can be done at ambient pressure and/or by using vacuum (at least partly). Air drying is also possible (for instance at the end of the drying process) or via a fluidized bed drying equipment. An advantage of the processes of the invention is that a heating to at most about 150, 149, 148, 147, 146 or 145° C., often at most about 140, 139, 138, 137, 136, 135, 134, 133, 132 or 131° C., preferably at most about 130, 129, 128, 127, 126 or 125° C., often at most 120, 119, 118, 117 or 116° C., even at most about 115° C. can suffice to dry the products. When applying a vacuum, even lower drying temperatures (e.g. at most about 110° C.) are possible and this has a positive effect on the product stability, as liquid thiosulfates, polysulfides and/or (bi)sulfites are in general susceptible to thermal and/or oxidative degradation. Also NBPT (optional compound c1) is sensitive to some extend to high thermal degradation.

In a preferred embodiment, a vacuum is applied during at least part of the drying step.

Optionally, additional compounds (c) and/or (d) can be admixed. They can be provided in step (i) or at a later stage, depending on their nature and function. For instance process aids like a granulation binder (d) can be added at a later stage.

When using liquid compounds (b') in a method of the invention, then in some occasions it may be handy to remove at least part of the water prior to their mixing with urea-containing compounds (a), for instance via evaporation. This applies in general but is useful in particular in the following embodiments.

In an alternative embodiment of the invention, materials (I), (II) and/or (III) of the invention are added to a standard urea production process, either to the molten urea in the urea synthesis unit or to the prilling tower. Materials (I), (II) and/or (III) of the invention are preferably added to molten urea just before the urea leaves the urea synthesis unit, or just after the urea has left the urea synthesis unit, before it passes to granulation. This way the retention time, that is the time passing between the addition of these products/composition to the urea melt and the mixture proceeding to granulation, is kept short (below about 30 minutes, below about 15, 10, 5 minutes, below about 60, 50, 40, 30 or even 20 seconds). Alternatively, the temperature of the urea melt can be kept low by adding an additive that allows to lower the urea melt temperature, like for instance UF80.

In an embodiment of the invention, a solid product (II) and/or (III) is added to the molten urea, in the urea synthesis unit or in the prill tower. In yet another embodiment of the invention a liquid thiosulfate and/or a liquid polysulfide and/or a liquid (bi)sulfite is added to the a molten urea, in the urea synthesis unit or in the prill tower. Alternatively, materials (I), (II) and/or (III) of the invention may be added to a heated liquid urea having in a granulation drum, preferably one that is equipped with a spray drier.

In any of the processes, the process often further contains one or more of the following steps: a compacting step, a granulation step, a sieving step, a grounding step and/or a packaging step.

In any of the above processes, compounds (b) are generally provided in such amounts that the final product (III) contains compounds (b) in an amount from about 1, 1.5, 2, 2.3 or 2.5 wt %. Preferably this amount is at least about 3, 3.5, 4, 4.5 or 5 wt %. In a particular embodiment of the invention, the amount of compounds (b) is at least about 10 wt %, more preferably at least about 15 wt %. Generally the amount of compounds (b) in the final product (III) is at most about 90, 85, 80, 75, 70, 65, 60, 55, 50, 45, 40, 35, 34, 33, 32, or 31 wt %. In other particular embodiments of the invention, the amount of compounds (b) is at most about 30, 29, 29, 28, 27, 26, or 25 wt %, or is at most about 24, 23, 22, 21, 21, 20, 19, 18, 17, 16, 15 wt %, or is even at most about 14, 13, 12, 11, or 10 wt %.

In any of the above processes, compounds (a) are generally provided in such amounts that the final product (III) contains compounds (a) in an amount from about 1, 1.5, 2 or 2.5 wt %. Preferably this amount is at least about 3, 3.5, 4, 4.5 or 5 wt %. In a particular embodiment of the invention, the amount of compounds (a) is at least about 15, 20, 25, 30 or 35 wt %. In another particular embodiment of the invention, the amount of compounds (a) is at least about 60, 65, 66, 67, 68, 69 or 70 wt %. Often the amount of compounds (a) is at most about 95, 94, 93, 92, 91, or 90 wt %, or at most about 89, 88, 87, 87 or 86 wt %, or even at most about 85 wt %. The preferred compound (a) is urea (a1).

Characteristics of Products (II) and (III) of the Invention

Preferred in the context of the invention, are products (II) and (III) that have compounds (a) and (b) spread substantially homogeneously within the solid particulate being produced. When present, then preferably also compounds (c), and (d) are spread substantially homogeneous over the product. When the latter are added at later stages, for instance by spraying the compounds on top of solid granules within a drying process (coating process), then a core-shell type kind of product is possible with compounds (c) and/or (d) and/or (e) present in the outer layers of the solid particulate formed, e.g. a urea granule.

Below an idea is given of the different types of products (II) and (III) that are possible in the invention.

In an embodiment of the invention, the product (II) or (III) is a solid thiosulfate-urea based product. In another embodiment of the invention, the product (II) or (III) is a polysulfide-urea based product. In yet another embodiment of the invention, the product (II) or (III) is a (bi)sulfite-urea based product. In yet another embodiment of the invention, the product (II) or (III) can contain a mixture of compounds (b): a mixture of compounds (b1) and (b2), of compounds (b1) and (b3), of compounds (b2) and (b3) or of compounds (b1), (b2) and (b3). Information on preferred compounds (b1), (b2) and (b3) can be found above.

In its simplest form products (II) and (III) of the invention contain water (e), urea-containing compounds (a) and compounds (b) only. Preferred ratios of compounds (a) to compounds (b) have been provided above.

Generally the amount of compounds (a), relative to the total of a+b, is at least about 2, 2.2, 2.3, 2.4, 2.5, 2.6, 2.7 or 3 wt %. Typically this amount is at most about 98, 97, 96, 96, 95, 94, 93, 92, 91 or 90 wt %. More preferably the amount of compounds (a) is at least about 4 wt %, relative to the total of a+b. In a particular embodiment, this amount is at least about 20, 30, or 40 wt %, relative to the total weight of a+b.

Generally the amount of compounds (b), relative to the total of a+b, is at least about 2, 2.1, 2.2, 2.3, 2.4, 2.5, 2.6, 2.7 or 3 wt %. Typically this amount is at most about 98, 97, 96, 96, 95, 94, 93, 92, 91 or 90 wt %. More preferably the amount of compounds (b) is at least about 4 wt %, relative to the total of a+b. In a particular embodiment, this amount is at least about 20, 30, or 40 wt %, relative to the total weight of a+b.

In a particular embodiment of the invention, compounds (a) are present in product (II) or (III) of the invention in an amount of at least about 3, 4, 5, or 6 wt %, preferably at least about 7, 8, 9, or 10 wt %, or more preferably at least about 11, 12, 13, 14, or 15 wt % and more.

In particular embodiments of the invention, compounds (a) are present in these products in an amount of at least about 85, 86, 87, 88 or 89 wt %, or even at least about 90 wt %.

In another particular embodiment of the invention, compounds (a) are present in an amount of at most about 15, 14, 13, 12, 11, or 10 wt %, or even at most about 9, 8, 7, 6 or 5 wt %. Compounds (b) are generally present in products (II) or (III) the invention in an amount of from about 1 to about 99 wt %, more preferably from about 2 to about 98 wt %, and most preferably from about 2.3 to about 97.7 wt %, from about 2.4 to about 97.6 wt % or from about 2.5 to about 97.5 wt %. Preferably this amount is at most about 95, 94, 93, 92 or 91 wt %, more preferably at most about 90, 89, 88, 87 or 86 wt %, even more preferably at most about 85, 84, 83, 82 or 81 wt %, and most preferably at most about 80 wt %.

At high concentrations (above about 85 wt %, and more in particular above about 90 wt %) the products benefit from a further drying by vacuum to remove extra water. This improved their storage stability. The use of dryers, desiccants, storage in closed boxes and/or vacuum storage or other ways to avoid contact with air (oxygen) and/or humidity may help reduce deliquescence that can start after a couple of days, or usually after a couple of weeks. When stored well sealed, then products tested were found to remain stable for up to one year.

In a particular embodiment of the invention, the amount of compounds (b) in these products is at least about 2, 3, 4, or 5 wt %, even at least about 10, 11, 12, 13, 14, of 15 wt %, up to at most about 25 wt %, more preferably at most about 20 wt %. Preferably, compounds (b) in this embodiment are chosen from those compounds that have a well-established urease and/or nitrification inhibiting effect so that no compounds (c) are needed.

In another particular embodiment of the invention, the amount of compounds (b) in these products is at most about 15, 14, 13, 12, or 11 wt %, more preferably at most about 10, 9 or 8 wt %. In this embodiment, the amount of compounds (b) is often at least about 1, 2, 3, 4 or 5 wt %.

When present, then urease inhibitors (c1) are generally present in an amount from about 0.001 wt % to about 85 wt %. Preferably this amount is at most about 80, 75, 70, 60 or 50 wt %. Usually this amount is at least about 0.01, 0.02, 0.03, or 0.04 wt %. Usually this amount is at most about 40, 39, 38, 37, or 36 wt %, most often at most about 35, 34, 33, 32, 31 or 30 wt %. A person skilled in the art will know how to adapt the amounts of NBPT in function of the way the solid products of the invention are made and used in the field, so that the quantity of NBPT added is about 900 mk/kg urea.

In one particular embodiment, the amount of compounds (c1) being present in products (II) and (III) of the invention is from about 0.001 to about 1.5 wt %, preferably from about 0.01 to about 1 wt %. The concentration of NBPT in urea granules is generally from about 0.04 to about 0.1 wt %. When present in outer layers only, then this amount may be at most about 0.5, 0.4, 0.3 or 0.2 wt %, even at most about 0.1, 0.09, 0.08, 0.07 or 0.06 wt %. Often at least about 0.0001, preferably at least about 0.02, 0.03 or 0.04 wt % of NBPT is present. Higher amounts can be present, for instance in carrier materials for compounds (c1). These materials can contain from about 0.1 wt % to about 85, 80, 75, 70, 65, 60, or 55 wt %, or preferably to about 50, 45, 40, 39, 38, 36, 37, 35, 34, 33, 32, 31 or 30 wt % of compounds (c1). Compounds (c1) are herein preferably present in an amount of at least about 1, 1.5, 2, 2.5, 3, 3.5, 4, 4.5 or 5 wt %.

When present, then nitrification inhibitors (c2) are generally present in an amount from about 0.01 to about 85 wt %, often to about 80 wt %. Preferably this amount is at most about 75, 70, 65, 60, 55 or 50 wt %. Often compounds (c) are present in an amount from about 0.04 to about 40 wt %. Preferably this amount is at least about 0.1 wt %, more preferably at least about 0.2 wt %. Usually this amount is at most about 39, 38, 37, or 36 wt %, most often at most about 35, 34, 33, 32, 31 or 30 wt %.

In urea granules, the amount of compounds (c2) is often from 0.01 to about 4 wt %, more preferably from about 0.1 to about 3 wt %. When present in outer layers only, then this amount may be lower. Higher amounts can be present, for instance in carrier materials for compounds (c2). These materials can contain from about 0.5 to about 85, 80, 75, 70, 65, 60, or 55 wt %, preferably to about 50, 45, 40, 39, 38, 36, 37, 35, 34, 33, 32, 31 or 30 wt % of compounds (c2). In a particular embodiment of the invention, this amount is at least about 1, 1.5, 2, 2.5, 3, 3.5, 4, 4.5 or 5 wt %.

In general, the total amount of compounds (c) is at most about 85, 80, 75, 70, 65, 60, or 55 wt %. Most often this amount as at most about 50, 45, 40, 35, 30 or even 25 wt %. In a particular embodiment of the invention though, compounds (c) are present in an amount of from about 15 to about 50 wt %, from about 20 to about 50 wt %, more preferably from about 25 to about 40 wt %.

In particular embodiment of the invention, compounds (c1) and/or (c2) are present in an amount from about 0.01 to about 20 wt %.

In all of the above, a preferred compound (c1) is NBPT, and a preferred compound (c2) is DCD. In the invention, the term 'NBPT', is used to refer not only to N-(n-butyl) thiophosphoric triamide in its pure form but also to commercial grades that may contain a given amount of impurities. The same applies for 'DCD'.

A particular embodiment of the invention, relates to products (II) or (III) of the invention that have NBPT but no DCD. Another particular embodiment of the invention, relates to products (II) or (III) that have DCD but no NBPT. Yet another particular embodiment of the invention relates to products (II) or (III) that have both NBPT and DCD.

Another embodiment of the invention, relates to products (II) or (III) that have no NBPT and no DCD. A particular embodiment of the invention, relates to products (II) or (III) wherein no compounds (c) are present. Even if compounds (c) are present then it is possible and preferred to have products that are substantially free from organic solvents including having a boiling point above about 150° C. Preferably they are also substantially free from organic solvents including having a boiling point above about 125° C.

In another particular embodiment of the invention, compounds (c1) and/or (c2) are present in an amount from about 2.5 to about 50 wt %. Preferably compounds (c1) and/or (c2) are then present in an amount of at least about 10, 11, 12, 13 or 14 wt %, preferably at least about 15, 16, 17, 19, 19 or 20 wt %, often at least about 25 wt %. In this embodiment, the amount of compounds (a) is usually from about 1 to about 15, 14, 13, 12, 11 or 10 wt % at most. In this embodiment, the amount of compounds (b) is usually from about 1 to about 15, 14, 13, 12, 11 or 10 wt % at most. The sum of the weight percentages of course does not exceed 100 wt %.

In yet another embodiment of the invention, compounds (b) are present in an amount of at least about 1, 1.5, 2, 2.5, 3, 3.5, 4, 4.5 or about 5 wt %. Most of the amount of compound (b) in products (II) or (III) of the invention is from about 2 wt % to about 90, 85, 80, 75, 70, 65, 60, 55, 50, 45, 40, 35, 34, 33, 32, or 31 wt %. The amount of compounds (b) is often at most about 30, 29, 28, 27, 26, 25, 24, 23, 22, 21, 21, 20, 19, 18, 17, 16, 15, 14, 13, 12, 11, or 10 wt %. In a particular embodiment of the invention, the amount of compound (b) is between about 2 wt % and about 90, 85, or 80 wt %. Products (II) and (III) to be used as N&S fertilizer often contain at most about 85, 84, 83, 82 or 81 wt %, even at most about 80, 79, 78, 77, 76 or 75 wt % of urea. An often used N&S fertilizer is for instance a 25-0-0-6S fertilizer. In this embodiment, compounds (c1) and/or (c2) can be present too though this is not needed. Compounds (c1), where present are then typically present in an amount from about 0.01 to about 0.1 wt %. Compounds (c2), where present are then typically present in an amount from about 0.1 to about 4 wt %. The sum of the weight percentages of course does not exceed 100 wt %.

A particular embodiment of the invention relates to urea granules that comprise compounds (b) and compounds (c1) and/or (c2). Preferably the urea granule of the invention has a N (nitrogen) content of at least about 35, 36, or 37 wt %, preferably at least about 38 or 39 wt %, or more preferably at least about 40, 41, or 42 wt %.

The amount of water (e) in products (II) or (III) of the invention, after drying, usually is from about 0.01 to about 10 wt %, preferably from about 0.02 to about 8 wt %. The final water content in products (II) or (III) preferably is less than about 8 wt %, preferably less than about 7, 6, 5, 4 or 3 wt %. More preferably the water content is less than about 2, 1.5, or 1 wt %. In a particular embodiment, the water content is less than about 0.5, 0.4, 0.3, or even 0.2 wt %. The 'water content' refers herein to the free water content as can be determined by a Karl Fischer method.

In a particular embodiment of the invention, water and compounds (a)+(b) are the primary constituents of products (II) or (III) of the invention. Preferably the sum of their weight percentages (of a+b+e) is at least about 80 wt %, most often at least about 85 wt %. Usually this sum is at least about 90, 91, 92, 93, 94, 95, 96, 97, 98, or 99 wt % and in particular this sum may equal 100 wt %. Of course, the sum of the weight percentages of a+b+c+d+e will not exceed 100 wt %.

Products (II) or (III) of the invention have many different applications and may vary widely in composition. Generally, however, the sum of the weight percentages of a+b+c+d+e is at least about 80, 85, 90 or even 95%. In one embodiment of the invention e.g. the sum of the weight percentages of a+b+c+d+e=100%, while in other embodiments the sum of a+b+c+e=100%, the sum of a+b+d+e=100%, the sum of a+b+c+e=100%, the sum of a+b+e=100% (possible impurities and possible degradation by-products herein included).

Products (II) or (III) of the invention in general contain less than about 5 wt % of oxidation by-products of compounds (b). Examples of oxidation by-products include the corresponding sulfates and/or sulfites and also elemental sulfur. Preferably less than about 3 wt %, more preferably less than about 2 wt %, or even more preferably less than about 1 wt % of these oxidation by-products of compounds (a) are formed during the drying process. Though the products (II) and (III) of the invention can be easily combined with UAN, the products themselves typically contain little to no UAN. They are sufficiently stable in themselves. Usually, they comprise less than about 1 wt % of UAN. Preferably, they comprise less than about 0.5 wt %, more preferably less than about 0.1 wt % of UAN, relative to the total weight of the product [in case of a product (I), (II) or (III)].

Products (II) or (III) of the invention in general have higher amounts of N and S. In any case, there will be an increased amount of nutrients (N, S, Ca, Mg and K) in the final products due to evaporation and concentration.

In another particular embodiment, products (II) or (III) of the invention are solid thiosulfates, solid polysulfides and/or a solid (bi)sulfites depending on the type of compounds (b) present. In such products the amounts of compounds (a) and where present compounds (c) and/or (d) are generally low.

In a preferred embodiment of the invention, at least compounds (a) and (b) are spread substantially homogeneously within the products (II) or (III) of the invention. Also, compounds (c) and/or (d) when present can be spread substantially homogeneously within the products (II) or (III). Alternatively, compounds (c) and/or (d) can be present primarily in the outer layers of the solid particulates being formed and/or they can be present in a coating applied onto the solid particulate formed, e.g. a urea granule. Alternatively, compounds (a) and (b), and where present (c) and/or (d), can all be present primarily in the outer layers of the solid particulates being formed and/or they can be present in a coating applied onto the solid particulate formed, e.g. a urea granule. Various forms and variations are thus possible, depending on how and at what moment the different compounds are added.

A Wide Variety of End Uses
Fertilizers

Products (I), (II), and (III) of the invention have a wide applicability but are in particular highly suited for use in or as fertilizer compositions. They were found highly compatible with standard liquid and solid NPK fertilizers or fertilizer ingredients.

Hence, provided is also a fertilizer composition, liquid or solid, comprising an aqueous composition (I) and/or a product (II) or (III) of the invention. Typically, this fertilizer composition comprises at least one further fertilizer compound that is different from compounds (I), (II), and (III) of the invention. That other fertilizer can be a standard NPK fertilizer, either liquid or solid. Suitable fertilizers with which products of the invention can be blended are set forth above.

Provided in the invention is in particular a liquid fertilizer composition that comprises materials (I), (II) or (III) of the invention. Products (I), (II) or (III) of the invention, when added to a liquid fertilizer preferably are re-solubilized in water or another suitable liquid, possibly UAN (urea ammonium nitrate fertilizer) before adding them to a liquid fertilizer. The liquid fertilizer composition of the invention can contain further standard ingredients like UAN (like UAN 28, UAN 32, etc.). Other liquid fertilizers with which products of the invention are compatible are liquid ammonium polyphosphates (APP), monoammonium phosphates (MAP), diammonium phosphates (DAP), urea-triazone liquid fertilizers like N-SURE®, etc. Possibly the liquid fertilizer can also contain a certain amount of solid fertilizers like additional urea, a solid ammonium sulfate, a solid magnesium sulfate, a solid potassium sulfate, a solid ammonium nitrate, a solid calcium nitrate, a solid potassium nitrate, etc.

Provided in the invention is in further also a solid fertilizer composition that comprises materials of the invention, in particular products (II) or (III) of the invention. These materials can be easily blended with standard solid fertilizers such as dry urea, a solid ammonium sulfate, a solid magnesium sulfate, a solid potassium sulfate, a solid ammonium nitrate, a solid calcium nitrate, a solid potassium nitrate, etc.

A particular fertilizer of the invention is a protected urea containing at least one thiosulfate (b1) and/or at least one polysulfide (b2) and/or at least one (bi)sulfite (b3) in an amount that they exert urease and/or nitrification inhibitory effects. This kind of urea fertilizer is typically provided under the form of a urea granule. Optionally this urea granule can further contain NBPT and/or DCD. In an embodiment of the invention, the urea granule contains NBPT, DCD or a mixture of both. In a particular embodiment of the invention the urea granule contains NBPT. In yet another particular embodiment of the invention the urea granule is substantially free from NBPT, preferably contains no NBPT. In another particular embodiment of the invention, the urea granule does not contain any NBPT or DCD.

A particular embodiment of the invention relates to products (I), (II) or (III) of the invention that can be characterized as liquid or solid carriers for nitrogen inhibitors like NBPT and/or DCD. These carrier materials can be incorporated into liquid and/or to solid fertilizers. An advantage of products of the invention is that they require less organic solvents like NMP, DMSO, etc. It is even possible and preferred to use 'dry' NBPT and/or dry DCD, without any liquid or solid carrier to make materials of the invention.

The invention will further be elucidated with the following examples, without being limited thereto.

EXAMPLES

General Set Up

In the following a specified amount of dry urea is mixed with the respective thiosulfate such as ammonium thiosulfate, potassium thiosulfate, calcium thiosulfate, magnesium thiosulfate, calcium polysulfide or ammonium (bi)sulfite. DCD and NBPT were added in dry form. Solid products with varying amounts of compounds (a), (b) and (c) were prepared and all were found to have a good shelf life when stored in a sealed container.

Throughout the invention and in the Examples section the following methods were used:

Determination of Kjeldhal nitrogen in fertilizers is by AOAC Method 978.02.

The amount of sulfur (S) is determined by AOAC Gravimetric Method No 980.02

If not otherwise mentioned, the amount of thiosulfates is determined via ion chromatography using an AS 11 4×250 mm with guard column AG11 4×50 mm. Mobile phase: 20 mM KOH (isocratic). Flow rate: 1 ml/min. Detection: conductivity.

Amount of potassium (K) was determined by AAS (Atomic Absorption Spectroscopy).

Water content is measured according to Karl-Fischer method.

Example 1

40 grams of 24% calcium thiosulfate aqueous solution was mixed with 60 grams of dry urea (max about 1 wt % of biuret). The resulting mixture was heated. At about 60° C., all urea dissolved. The heating was continued and the mixture was heated to about 100° C. until solids started forming in the mixture. Analyses via ion chromatography showed near 14 wt % calcium thiosulfate in the solid product. Total nitrogen in the solid product obtained was near 39 wt %.

Same was repeated but a using vacuum of about 0.7 bar (22 mmHg). This lowered the heating to about 80° C.

Example 2

40 grams of a 24 wt % calcium thiosulfate liquid solution was mixed with 55 grams of dry urea, 1 grams of solid NBPT and 4 grams of solid DCD. The mixture was heated with or without vacuum as above and the water was removed. The resulting solid was further air dried and packaged as such. The solid product contains near 14 wt % of calcium thiosulfate.

Example 3

80 grams of 50 wt % ammonium thiosulfate and 20 grams of dry urea were mixed and the water was removed using heat between about 100-105° C. The resulting solid was further air dried and packaged as such. The solid product contains near 67 wt % of ammonium thiosulfate.

Example 4

197.6 grams of urea, 199.46 grams of water, 0.999 grams of NBPT, 3.95 grams of DCD, and 52.4 grams of a 50 wt % ammonium thiosulfate were mixed. Total volume was 400 ml. Theoretically, this provides a blend of 20-0-0-35-1 wt % NBPT-4 wt % DC in liquid state. The mixture was heated at about 100-110° C. The volume was reduced from 400 ml to around 180 ml. The mixture turned cloudy and solids formed in the solution. Heating stopped and the mixture cooled at ambient. The resulting solid was further air dried and packaged as such. The solid product contains near 11.6 wt % of ammonium thiosulfate.

Example 5

Larger scale samples were prepared using a Kemutec reactor dryer of 400 liter. A solid stirrer scrapes the product from the inside of the reactor and breaks the products. The dryer can be placed under vacuum for drying so that drying temperatures can be reduced to about 70° C.

First, the thiosulfate, urea and some extra water are loaded in the reactor. At about 60° C., when everything is in solution, the water is evaporated under vacuum while stirring at low speed. After evaporation, the reactor is cooled to about 25° C. and the vacuum is broken with a stream of $N_2$. To avoid bigger clumps, the product is sieved (5 mm sieve).

Calcium thiosulfate-urea based products were prepared this way having respectively 4 wt %, 6 wt % and 8 wt % of $CaS_2O_3$. One sample was prepared with 6 wt % of $CaS_2O_3$ and 1 wt % of NBPT. Similarly, ammonium thiosulfate-urea based products were prepared this way having respectively 5 wt %, 10 wt % and 15 wt % of $(NH_4)$. All proved stable after drying: no degradation and/or discoloration was observed. The amount of residual free water varied from 0.4 to 0.1 wt %.

Example 6

Ammonium bisulfite is a 60-67% liquid solution with a pH about 5-5.8. A solid product was obtained by mixing this ammonium bisulfite solution with dry urea in a 1:1 weight ratio (i.e., 100 grams dry urea was added to 100 grams of this 60-70 wt % ammonium bisulfite solution in water). Addition of the urea was done as described before using some preheating (about 50-60° C.). Water was removed by heating to about 100° C. A white solid was obtained after a slow drying for about 2 hours at this temperature.

Example 7

Calcium polysulfide (lime sulfur) is a compound having high urease activity. Calcium polysulfide of the following formula—$CaS_X$ (X=2-4.5)—was used to prepared the dry product in question. This product was found to contain a mixture of calcium sulfide, calcium trisulfide, calcium tetrasulfide, and calcium pentasulfide.

A solid product was obtained by mixing this calcium polysulfide with dry urea in a 1:1 weight ratio (i.e., 100 grams dry urea was added to 100 grams of a 24-29 wt % calcium polysulfide solution in water) and the mixture was heated up to about 100° C. under constant stirring to drive off most of the water. A lightly yellowish solid was collected by filtration and air dried. The crystalline material collected and stored as such.

Liquid and Solid End Fertilizers

Example 8

Urea, CaTs®, NBPT and DCD blend: 15-0-0+4 Ca+0.0375 NBPT and 0.75 DCD

Liquid and solid end fertilizers:

Example 8:
Urea, CaTs ®, NBPT and DCD blend: 15-0-0 +
4 Ca + 0.0375 NBPT and 0.75 DCD

| Product | Lbs/ton |
| --- | --- |
| Urea | 643 |
| CaTs ® | 1333 |
| NBPT | 0.75 |
| DCD | 15.0 |
| Water added | 8.25 |

Example 9:
Urea, KTS ®, NBPT, DCD blend: 21-0-10 +
0.0525 NBPT + 0.75 DCD

| Product | Lbs/ton |
| --- | --- |
| Urea | 867.4 |
| KTS ® | 800 |
| NBPT | 1.0 |
| DCD | 21.0 |
| Water added | 310.6 |

Example 10:
Urea, MagThio ®, NBPT and DCD blend: 15-0-0 +
2.0 Mg + 0.037 NBPT + 1.15 DCD

| Product | Lbs/ton |
| --- | --- |
| Urea | 630 |
| MagThio ® | 1000 |
| NBPT | 0.75 |
| DCD | 15.0 |
| Water added | 354.25 |

Example 11:
Urea, Thio-Sul ®, NBPPT and DCD blend: 20-0-0 +
8 S + 0.037 NBPT + 1.0 DCD

| Product | Lbs/ton |
| --- | --- |
| Urea | 680 |
| Thio-Sul ® | 615 |
| NBPT | 0.78 |
| DCD | 20 |
| Water added | 684.4 |

In keeping with fertilizer regulations, all percentages for NBPT and DCD in Examples 8-11 are expressed relative to the total weight of the product. Removal of water from the liquid mixtures herein described leads to a solid particulate according to the invention.

The amount of compounds (b) on a dry weight basis is about 16.7 wt % in Example 8; about 20 wt % in Example 9, about 9.5 wt % in Example 10 and about 17.8 wt % in Example 11.

In the above, 'CaTs®' refers to the Tradename of a commercial 24-25 wt % calcium thiosulfate; 'KTS®' refers to the Tradename of a commercial 50 wt % potassium thiosulfate solution; 'MagThio®' refers to the Tradename of a commercial 24 wt % magnesium thiosulfate solution; and 'Thio-Sul®' refers to a commercial 57-60 wt % ammonium thiosulfate solution.

Example 12: Thiosulfate Stability

Following calcium thiosulfate-urea based products are prepared according to Example 5:
  Calcium thiosulfate-urea based products containing 2 wt % $CaS_2O_3$
  Calcium thiosulfate-urea based products containing 4 wt % $CaS_2O_3$
  Calcium thiosulfate-urea based products containing 6 wt % $CaS_2O_3$
Following ammonium thiosulfate-urea based products are prepared according to a similar procedure as Example 3:
  Ammonium thiosulfate-urea based product containing 10 wt % $(NH_3)_2S_2O_3$
  Ammonium thiosulfate-urea based product containing 15 wt % $(NH_3)_2S_2O_3$
  Ammonium thiosulfate-urea based product containing 20 wt % $(NH_3)_2S_2O_3$
The products were measured for their storage stability in terms of stability of the content of $CaS_2O_3$ or of $(NH_3)_2S_2O_3$ in the product. Measurements are made at 0 month after production (i.e. the initial content of $CaS_2O_3$ or of $(NH_3)_2S_2O_3$, 2 months after production, 4 months after production.) Samples are stored at room temperature (about 18° C. to 25° C.) in closed polyethylene containers.

The amount of thiosulfates is measured according to following method from American National Standards Institute: SPECIFICATION FOR PHOTOGRAPHIC GRADE AMMONIUM THIOSULFATE SOLUTION; Procedure #ANSI-PH4.252-1980; 1980.

Results are shown in Table 1 below.

TABLE 1

| Sample | | 0 months | 2 months | 4 months |
| --- | --- | --- | --- | --- |
| CaTs ® 2% | $CaS_2O_3$ | 2.1 | 2.0 | 2.0 |
| | $H_2O$ | 0.8 | 0.2 | 0.2 |
| | Color | white | white | White |
| CaTs ® 4% | $CaS_2O_3$ | 3.7 | 3.7 | 3.6 |
| | $H_2O$ | 0.8 | 0.2 | 0.3 |
| | Color | white | white | White |
| CaTs ® 6% | $CaS_2O_3$ | 6.2 | 6.0 | 5.9 |
| | $H_2O$ | 0.8 | 0.2 | 0.2 |
| | Color | white | white | white |
| Thio-Sul ® 10% | $(NH_3)_2S_2O_3$ | 9.8 | 9.7 | 9.5 |
| | $H_2O$ | 2.1 | 1.9 | 1.6 |
| | Color | white | white | White |
| Thio-Sul ® 15% | $C(NH_3)_2S_2O_3$ | 15.1 | 15.1 | 15.0 |
| | $H_2O$ | 2.7 | 2.3 | 2.3 |
| | Color | white | white | White |
| Thio-Sul ® 20% | $(NH_3)_2S_2O_3$ | 18.6 | 18.9 | 18.5 |
| | $H_2O$ | 3.1 | 2.8 | 2.7 |
| | Color | white | white | White |
| Thi-Sul ® 20% + NBPT | $(NH_3)_2S_2O_3$ | 18.1 | 17.8 | 18.0 |
| | $H_2O$ | 2.8 | 2.4 | 2.3 |
| | Color | white | white | white |

Example 13: Thiosulfate Stability

Calcium thiosulfate-urea based products are evaluated to determine whether elemental sulfur is formed upon storage. Samples are made by dissolving 12.5 g, 25 g and 50 g of dry calcium thiosulfate/urea product of different CaTs®/urea ratios (see table below) in 87.5 g, 75 g and 50 g of water respectively, to produce a 12.5%, 25% and 50% solution respectively. After dissolution, all samples are clear without any visible particles. The samples are kept in closed glass containers for 5 months. At 5 months, the samples are observed for the presence of elemental sulfur. When present, elemental sulfur is visible with the naked eye as precipitated particles. A clear solution means that substantially no elemental sulfur is formed. The results are shown in table below.

The amount of thiosulfates is measured according to following method from American National Standards Institute; SPECIFICATION FOR PHOTOGRAPHIC GRADE AMMONIUM THIOSULFATE SOLUTION; Procedure #ANSI-PH4.252-1980; 1980.

Results are shown in Table 2 below.

TABLE 2

| Sample | 12.5% solution | 25% solution | 50% solution |
|---|---|---|---|
| CaTs ®/ Urea 2/98 w/w | Clear watery solution | Clear watery solution | Clear watery solution |
| CaTs ®/ Urea 4/96 w/w | Clear watery solution | Clear watery solution | Clear watery solution |
| CaTs ®/ Urea 6/94 w/w | Clear watery solution | Clear watery solution | Clear watery solution |

The invention claimed is:

1. A thiosulfate-urea based product (IIa) comprising:
   urea (a),
   one or more thiosulfate (b),
   optionally, one or more urease (c1) and/or nitrification (c2) inhibitors that are different from thiosulfates (b), and/or
   optionally, one or more additives (d) that are different from any of the above compounds;
   wherein the amount of water (e) in the product (IIa) is less than about 10 wt %;
   wherein the thiosulfate-urea based product (IIa) is a solid particulate wherein at least (a) and (b) are spread substantially homogeneously within the particles of the solid particulate;
   wherein the amount of urea in the product (IIa) is at least about 1 wt % and at most about 98 wt %;
   wherein the thiosulfates (b) are present in an amount of at least 2 wt. %;
   wherein the ratio of urea (a) to the thiosulfates (b) is from 10:90 to 90:10;
   with the proviso that if the thiosulfate (b) is ammonium thiosulfate, the amount of urea in the product (IIa) is at least about 1 wt % and at most about 90 wt %.

2. The product (IIa) of claim 1, wherein the sum of the weight percentages of compounds (a)+(b)+(e) is at least about 90 wt %.

3. The product (IIa) of claim 1, comprising no NBPT, and no DCD.

4. The product (IIa) of claim 1, comprising less than about 3 wt % of oxidation by-products of thiosulfates (b).

5. The product (IIa) of claim 1, comprising at most about 10 wt % of urea, at most about 10 wt % of thiosulfates (b), and from about 15 to about 80 wt % of compounds (c).

6. The product (IIa) of claim 1, comprising at least about 10 wt % of thiosulfates (b).

7. The product (IIa) of claim 1, which is a urea granule having an amount of N (nitrogen) of at least about 35 wt %.

8. The product (IIa) of claim 1, wherein urea (a) and/or thiosulfates (b):
   are present in a coating applied onto the product (III).

9. A fertilizer composition (IV) comprising a product (IIa) according to claim 1, and at least one other fertilizer different from products (IIa) and (III).

10. A thiosulfate-urea based product (IIa) comprising:
    urea (a),
    one or more thiosulfates (b),
    optionally, one or more urease (c1) and/or nitrification (c2) inhibitors that are different from thiosulfates (b), and/or
    optionally, one or more additives (d) that are different from any of the above compounds;
    wherein the amount of water (e) in the product (IIa) is less than about 10 wt %;
    said product (IIa) comprising at least about 6 wt % and at most about 95 wt % of thiosulfates (b);
    and wherein the thiosulfate-urea based product (IIa) is a solid particulate wherein at least (a) and (b) are spread substantially homogeneously within the particles of the solid particulate.

11. The product (IIa) of claim 10, wherein urea (a) is present in an amount of at least about 1 wt %.

12. A process for making a thiosulfate-urea based product according to claim 1, said process comprising the steps of:
    (i) Providing a mixture of urea (a) with one or more thiosulfates (b),
       said mixture containing water (e),
    (ii) Optionally, adding one or more compounds (c1), (c2), and/or (d) as recited,
    (iii) Optionally, adding extra water (e),
    (iv) Obtaining a substantially homogeneous mixture,
    (v) Removing water from this homogeneous mixture until a product (III) is obtained with a water content of at most about 10 wt %;
    wherein the product (III) obtained contains urea in an amount of at least about 1 wt %, and at most about 98 wt %;
    wherein the thiosulfates (b) are present in an amount of at least 2 wt % in the product (III);
    wherein the ratio of urea (a) to the thiosulfates (b) is from 10:90 to 90:10 in the product (III);
    with the proviso that if the thiosulfate (b) is ammonium thiosulfate, the amount of urea in the product (III) is at least about 1 wt %.

13. A process for making a thiosulfate-urea based product according to claim 1, said process comprising the steps of:
    (i) Providing a mixture of urea (a) with one or more thiosulfates (b),
       said mixture containing water (e),
    (ii) Optionally, adding one or more compounds (c1), (c2), and/or (d) (c) and/or (d) as recited,
    (iii) Optionally, adding extra water (e),
    (iv) Obtaining a substantially homogeneous mixture,
    (v) Removing water from this homogeneous mixture until a product (III) is obtained with a water content of at most about 10 wt %;
    wherein the product (III) obtained contains compounds (b) in an amount of at least about 6 wt %; and
    wherein the product (III) is a solid particulate wherein at least (a) and (b) are spread substantially homogeneously within the particles of the solid particulate.

14. The process of claim 13 wherein in step (i) thiosulfates (b) are provided as a solution in water and/or wherein in step (i) thiosulfates (b) are provided in solid form.

15. The process of claim 13, wherein the temperature of the mixture containing urea (a) and thiosulfates (b) does not exceed about 250° C.

16. The process of claim 13, wherein the temperature of the mixture containing urea (a) and thiosulfates (b) does not exceed about 85° C.

17. The process claim 13, further comprising a granulation step.

18. The process of claim 13, wherein urea (a) and/or thiosulfates (b) are further present in a coating applied onto product (III).

* * * * *